United States Patent
Bern et al.

(10) Patent No.: US 6,898,422 B2
(45) Date of Patent: May 24, 2005

(54) METHOD AND SYSTEM FOR PROVIDING MOBILE SERVICES

(75) Inventors: Marie Bern, Stockholm (SE); Bruno Blank, Nacka (SE); Anders Hagberg, Stockholm (SE); Mattias Häggström, Ärsta (SE); Jonas Kjellström, Bromma (SE); Jonas Lindroth, Stockholm (SE); Jan Ouzounidis, Stockholm (SE)

(73) Assignee: Microsoft Corporation, Redmond, WA (US)

( * ) Notice: Subject to any disclaimer, the term of this patent is extended or adjusted under 35 U.S.C. 154(b) by 744 days.

(21) Appl. No.: 09/834,222

(22) Filed: Apr. 12, 2001

(65) Prior Publication Data

US 2002/0009986 A1 Jan. 24, 2002

(30) Foreign Application Priority Data

Apr. 19, 2000 (SE) .............................................. 0001455
Jun. 28, 2000 (SE) .............................................. 0002434

(51) Int. Cl.[7] ............................. H04Q 7/20; H04Q 7/38
(52) U.S. Cl. ................................ 455/412.1; 455/412.2; 455/414.1; 455/414.4; 455/466; 455/550.1; 455/445; 370/338; 370/428; 709/206; 709/219; 379/93.01; 379/93.24; 379/100.08
(58) Field of Search ........................... 455/426.1, 426.2, 455/413, 466, 550.1, 556.1, 556.2, 414.1, 414.2, 414.36, 414.4, 412.1, 412.2, 422.1, 445, 557, 403; 370/338, 428; 709/203, 206, 207, 219; 379/93.24, 100.08, 100.09, 93.01, 88.13, 88.14

(56) References Cited

U.S. PATENT DOCUMENTS

| | | | |
|---|---|---|---|
| 6,629,130 B2 | * | 9/2003 | Mertama et al. ............. 709/206 |
| 6,697,942 B1 | * | 2/2004 | L'Heureux et al. .......... 713/152 |
| 2003/0095642 A1 | * | 5/2003 | Cloutier et al. ........... 379/88.13 |

FOREIGN PATENT DOCUMENTS

| | | | |
|---|---|---|---|
| CA | 2302801 A1 | * | 9/2001 |
| EP | 0 833 492 A2 | | 4/1998 |
| WO | WO 97/08906 A1 | | 3/1997 |
| WO | WO 98/03005 A1 | | 1/1998 |
| WO | WO 98/48549 | | 10/1998 |
| WO | WO 99/52247 A2 | | 10/1999 |
| WO | WO 99/63742 | | 12/1999 |
| WO | WO 99/65256 A2 | | 12/1999 |
| WO | WO 00/02403 A1 | | 1/2000 |

* cited by examiner

Primary Examiner—Keith T. Ferguson
(74) Attorney, Agent, or Firm—Workman Nydegger

(57) ABSTRACT

A mail server site and a method in a mail server site provide mobile e-mail services to mobile stations connected to a digital radio communication network. Furthermore, a method in a mobile station utilizes the mobile e-mail services provided by the inventive mail server site. The mail server site includes a mail server host operating in accordance with POP3- or IMAP4-like protocols with respect to the usage of unique identifiers (UIDs) for identifying e-mail messages stored by the mail server host. Modified UIDs are allocated to e-mails received by the mail server site and transmitted to mobile mail clients using a short message based service. When the mail server host communicates with these mail clients, these modified UIDs will be used in the same way as conventional UIDs are used within the scope of a POP3 or IMAP4 protocol.

23 Claims, 2 Drawing Sheets

METHOD AND SYSTEM FOR PROVIDING MOBILE SERVICES

TECHNICAL FIELD

The present invention relates to use of short messages, of the kind provided by a digital radio communication network, in connection with providing access to stored digital data over the digital radio communication network.

BACKGROUND OF THE INVENTION

Today there exist a number of examples of message based services that are provided in accordance with certain standards in digital communication systems. Examples of such services are SMS (Short Message Service) and USSD (Unstructured Supplementary Service Data) in the digital radio communication network GSM. Similar message based services exists, or will exist, in other existing or future digital radio communication networks, such as GPRS, CDMA, D-AMPS (IS-136), PDC (Pacific Digital Cellular), W-CDMA (Wideband Code Division Multiple Access) and UMTS/IMT-2000.

These message based services of different digital radio communication networks are normally used for transferring text information to be presented on the display of a receiving mobile station, but also for transferring text or data to be interpreted by a receiving mobile station in different ways. Thus, these message based services are also being used as a basis for providing different new types of supplementary services.

An example of the use of a message based service for providing a new type of service is described in International Publication No. WO 97/08906, which is incorporated herein by reference. In WO 97/08906 it is disclosed how messages of a message based service, such as the SMS service of a GSM network, are used for transferring agents from a server to a mobile communication station. The server transmits an SMS message with an agent to a mobile subscriber upon receipt of an e-mail addressed to that subscriber. The agent agent includes coded information instructing the mobile subscriber, i.e., a mobile station or its connected computer, how to initiate a particular action with respect to the e-mail, such as retrieving the e-mail from the server in order to display it. Thus, a transferred SMS message and its agent is associated with an e-mail and is used to notify a user of a mobile communication station that an e-mail has been received. In addition to enable a mobile subscriber to read an e-mail, the service provides a number of other options for how the e-mail can be accessed, such as deleting it, forwarding it to a fax or another mobile subscriber etc.

SMTP (Simple Mail Transfer Protocol), POP3 (Post Office Protocol, version 3) and IMAP4 (Internet Message Access Protocol, version 4) are protocols for transfer and delivery of e-mails. Even though a person skilled in the art is well familiar with these protocols, some of their features and operations will be discussed below when further describing the technical background and problems with prior art with respect to the present invention.

The SMTP is a protocol which provides mechanisms for transmission of e-mails from a sending mail server host to a receiving mail server host. SMTP is independent of the particular transmission system and will transfer e-mails directly between two mail server hosts when the two hosts are connected to the same transport service, or via one or more relay SMTP servers when the sending and receiving hosts are not connected to the same transport service. The transmission includes routing, acceptance and delivery between the mail server host. Examples of transport services are TCP (Transmission Control Protocol) and X.25. At the sending SMTP server an SMTP sender process initiates a transport service connection to an SMTP receiver process at the receiving SMTP server. The SMTP sender process initiates SMTP commands and controls the transfer of an e-mail, the SMTP receiver process replies to the commands and performs the specified operations. If an end-user do not wish to have an SMTP server resident and continuously running on his computer, e.g., due to lack of computer resources or due to costs for being connected to a network, the user may choose to run a mail client program on his computer. In this case, an e-mail addressed to a specific mail box will be stored at a receiving mail server host before eventually being delivered to a mail client corresponding to the mail box.

POP3 is a protocol which allows for an e-mail to remain on a receiving mail server host until a mail client, i.e., a user, is ready to receive it. When the mail client is connected to the mail server host and requests a stored e-mail, the e-mail is downloaded from the user's mail box to the mail client. POP3 is a protocol typically used by Internet Service Providers to enable their end-users to access their e-mails. POP3 is a so called off-line protocol, which means that e-mails are downloaded from the mail server host, stored on the users local hard disk, deleted from the server host and then displayed to the user. Another e-mail delivery protocol is IMAP4. IMAP4 is an on-line protocol which means that a user not only is able to manage his e-mails off-line but also on-line, by enabling e-mails and folders to be permanently stored in a storage area of the server host. This resembles some of the existing proprietary e-mail systems and is useful if a user utilizes more than one computer for accessing his e-mails, e.g., a stationary computer at the office and a portable computer during travel, since the e-mails are stored on the server and can be accessed from whatever computer used.

The mail server to which a user connects with a POP3 mail client includes a POP3server host. When a user wishes to make use of the e-mail service he establishes a connection with the server host from the mail client and exchanges commands and responses with the POP3 server host during a session. Similarly, when the mail server host operates in accordance with the IMAP4 protocol, a mail client connects to the IMAP4 server host for exchanging commands and responses during a session.

The e-mails stored by a POP3 server host or a IMAP4 server host are accessed by the use of numbers. These numbers are either message sequence numbers or unique identifiers (UIDs). Unlike message sequence numbers, unique identifiers persist across sessions between the mail client and the mail server host. A unique identifier uniquely identifies an e-mail stored at the mail server host and consists of a server-determined string of one to 70 characters. The server should never reuse a unique identifier in a given mail box. The UIDs can be listed with a UIDL command which returns the UIDs for each e-mail in the mail box. Alternatively, the UIDL command is followed by a message sequence number, in which case the UID of the e-mail message, which during this specific session has the given message sequence number, is returned. Using a UID, a mail client can retrieve a specific corresponding message from the POP3 or IMAP4 server host independent of the specific session. With the IMAP4 protocol, additional operations can be preformed with respect to an e-mail using its corresponding UID.

Thus, if an end-user wishes to identify and retrieve a particular e-mail from a mail server host he has to list all the UIDs of the e-mails in the mail box. A specific e-mail can then be retrieved using the corresponding UID together with an appropriate command. If a POP3 or IMAP4 mail client is running on a mobile communication station and if a message based service were to be used for notifying a mobile subscriber of a new received e-mail, the mobile subscriber still have to list either the UIDs or the message sequence numbers of all e-mails in his mail box. The user would most likely not be able to ask the server host for the UID using the appropriate command together with a message sequence number argument, since it most often would not be possible for the user to know how many e-mails he had in his mail box when the current session with the server host started. The user can acquire the number of e-mail messages in the mail box by issuing an appropriate command. He would then receive a response after which a command together with the highest message sequence number could be issued for retrieving the UID of the last received e-mail.

Irrespective of which of the above-mentioned methods that are used for retrieving a specific e-mail, or for retrieving the last received e-mail, the communication between the mail server host and the mail client resulting from the commands issued, and/or listing of UIDs or message sequence numbers, will load down the mail system as well as the digital radio communication system, not to say that it will slow down the performance of the mail service.

SUMMARY OF THE INVENTION

One object of the present invention is to provide a mail client with the ability to, over a digital radio communications network, access a specific e-mail stored by a corresponding POP3- or IMAP4-like mail server host without first having to download all UIDs or all message sequence numbers of all the e-mails stored in the mail box of the mail client, or having to issue one or more commands to the mail server host for retrieving a UID corresponding to the specific e-mail.

According to the present invention this object is achieved by methods and arrangements having the features as defined in the appended claims.

The present invention is based on the insight that if a UID (Unique Identifier) of an e-mail used by a POP3, IMAP4 or similar mail server host could be known beforehand, an e-mail stored at the POP3/IMAP4 mail server could be accessed without the overhead of having to ask the server to list all UIDs assigned to the e-mail messages of a particular mail box or having to issue a sequence of commands for retrieving a UID of a particular e-mail. This is accomplished by combining the technique of transferring notifications to mobile subscribers with the provision of modified UIDs with which a mail server host can identify e-mail messages in accordance with the POP3- or IMAP4 protocol. A notification with a modified UID is transferred to a mobile communication station using a message based service. By means of this notification, or rather its included modified UID, the mobile subscriber is able to point out a corresponding e-mail stored by the POP3/IMAP4 server. Another name for a modified UID is job identifier.

It will be clear to any person skilled in the art that the present invention is applicable in connection with any mail delivery protocol which handles unique identifiers in the same, or a similar, way as the POP3 or IMAP4 mail delivery protocols when identifying e-mail messages stored by a POP3 or IMAP4 mail server host and when providing a corresponding mail client host with access to stored e-mails.

According to the invention a mail server site is connected to a digital radio communication network for providing its mobile subscribers with mobile e-mail services. The mail server site includes a mail server host operating in accordance with POP3- or IMAP4-like protocols with respect to the usage of unique identifiers (UIDs) for identifying e-mail messages stored by the mail server host. Modified UIDs, or job identifiers, are allocated to e-mails received by the mail server site and stored in a database together with the e-mails. When the mail server host communicates with a mail client it uses these job identifiers in the same way as conventional UIDs are used within the scope of a POP3 or IMAP4 protocol. A mobile subscriber is notified of an e-mail message received by the mail server site by transmission of a notification addressed to a mobile subscription number which corresponds to the address to which the e-mail message was addressed. The notification includes the job identifier with which the mail server host can identify the e-mail message stored in the database.

Consequently, the invention also comprises a method and an arrangement in a mobile communication station for utilizing the mobile e-mail services provided by the mail server site. The mobile communication station receives a message of the kind provided by the digital radio communication via its message based service. The message notifies the mobile communication station of a received e-mail and includes a job identifier, i.e., a modified UID, identifying the e-mail stored at the mail server site connected to the digital radio communication network. The mobile communication station extracts the job identifier which then is used in commands of a POP3 or IMAP4-like protocol when requesting to access the e-mail stored by the email server site. The commands are issued by a mail client program running the POP3 or IMAP4-like protocol. A job identifier is used by the commands of the POP3 or IMAP4-like protocol in the same way as they would normally use a UID.

One advantage with the mobile e-mail service provided by the present invention is that a user of a mobile communication station does not have to manually input a UID or message sequence number when issuing a command for accessing an e-mail. Manual input of a UID is superfluous since the job identifier identifying the e-mail at the POP3 or IMAP4 server host has been received with a notification in a message and can be used in a mail delivery protocol command when replying to the message.

Furthermore, a user does not have to issue a sequence of commands for retrieving a UID corresponding to a specific mail, or, alternatively, request the listing of all UIDs of the stored e-mail in the user's mail box at a mail server host.

Moreover, a notification and its job identifier can be stored by the mobile communication station, and the user can recall the job identifier whenever suitable for selectively accessing a corresponding e-mail. Without the job identifier a user would have to retrieve a UID for a specific e-mail using one of the herein previously described time consuming methods. Additionally he would probably need to retrieve some e-mail header information from his stored e-mails before being able to identify which of the e-mails that in fact is the e-mail he is interested in.

Also, the present invention enables a mobile subscriber to very easily forward a received e-mail, or rather a pointer to a received e-mail stored by the mail server host, by simply forwarding a received notification with a job identifier to another mobile subscriber. This is easily accomplished by forwarding the message that included the notification by using the message based service provided by the network.

It should be understood that the expression to access an e-mail includes a number of possible operations with respect to the e-mail, such as retrieving the e-mail deleting it, forwarding it, reading its header information only, reading a first or a second part of the e-mail information body, or in any other way manipulating with, or retrieving information from, the e-mail.

It is to be understood that what is meant by the expression mobile communication station in this document is either a stand-alone RF (Radio Frequency) transceiver having processing capabilities and displaying means, such as a mobile telephone or a hand-held PDA (Personal Digital Assistant), or, a RF transceiver together with any kind of portable or stationary equipment having processing capabilities, such as a portable laptop computer or a stationary personal computer, wherein the RF transceiver is arranged in communication with the portable or stationary equipment.

Preferably, the digital radio communications network is the GSM network and the message based service is the SMS service provided by the GSM network. Consequently, the following description of an exemplifying embodiment will refer to the GSM network and its message based service SMS. As previously mentioned, it should, however, be understood that the invention is not limited to these systems, but can also be applied to other existing or future digital mobile networks having message based services of a similar kind, such as the digital mobile networks GPRS, CDMA, D-AMPS (IS-136), PDC (Pacific Digital Cellular), W-CDMA (Wideband Code Division Multiple Access) and UMTS/IMT-2000.

The invention and its features and advantages will be more fully understood from the following description of an exemplifying embodiment thereof.

BRIEF DESCRIPTION OF THE DRAWINGS

An exemplifying embodiment of the invention will now be described by way of example with reference to the accompanying drawings, in which:

FIG. 2 shows an exemplifying test portion of an SMS message.

DETAILED DESCRIPTION OF THE PREFERRED EMBODIMENTS

Figure 1:
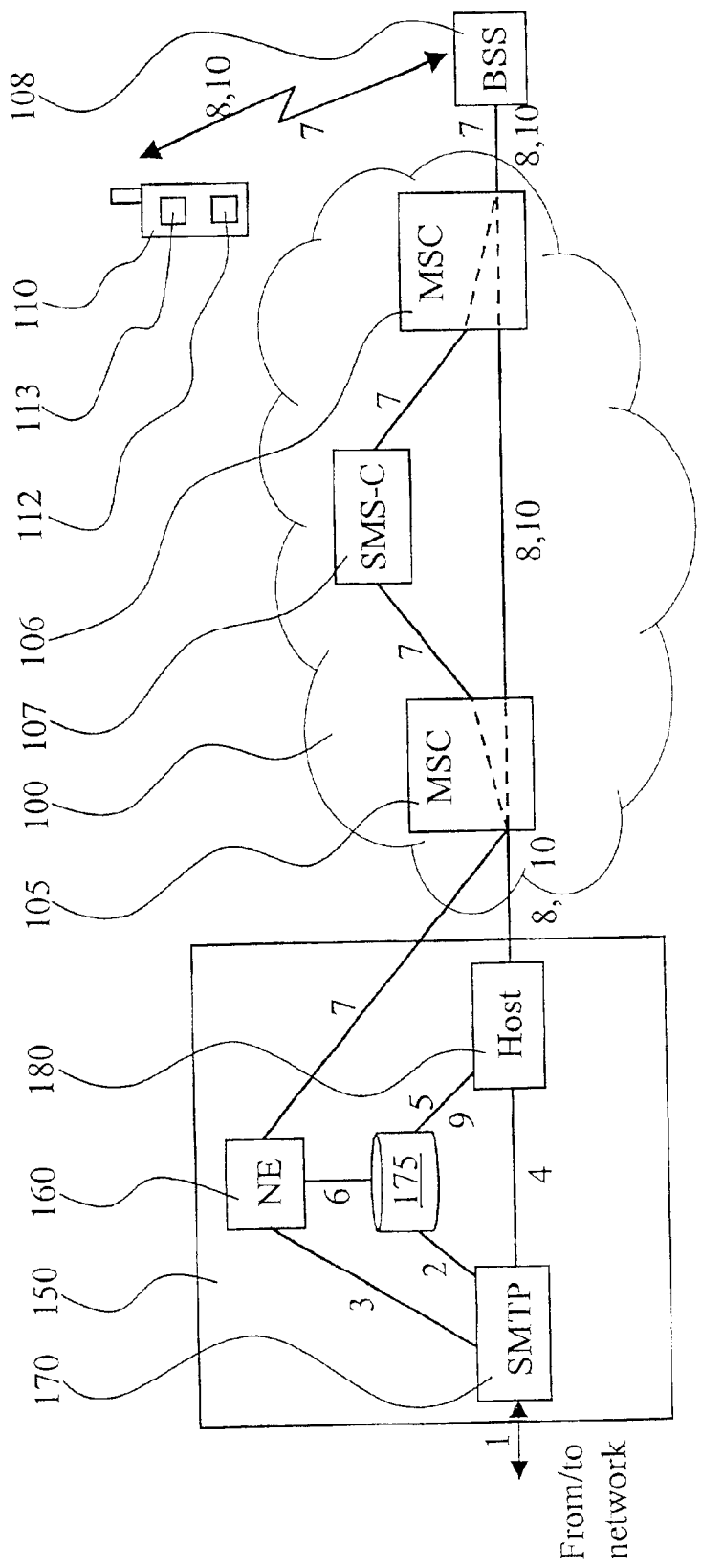
FIG. 1 shows a mail server site and a mobile communication station connected to digital radio communication network.

With reference to FIG. 1 an embodiment of the invention will know be described in greater detail. In FIG. 1 the digital radio communication network is exemplified with a GSM mobile communication network 100 (Global System for Mobile communication). Two of the MSC switches (Mobile service Switching Center) included in the GSM network are shown, MSC 105 and MSC 106. The MSC 106 communicates with a mobile communication station 110, here exemplified with a mobile telephone, via a Base Station System, BSS, 108 and a GPRS or GSM radio interface. The MSC switch 106 manages the traffic to/from the mobile communication station 110, which may be a speech connection in progress, the transfer of a short message, such as an SMS (Short Message Service) message, or some other GSM traffic. The SMS messages directed to, and originating from, the mobile communication station 108 are switched in an SMS center (SMS-C) 107. This SMS center routes received SMS messages to a certain MSC, in FIG. 1 to either MSC 105 or MSC 106, and hence, eventually, to the right recipient in accordance with commonly known techniques. Between the BSS 108 and the mobile communication station 110, the SMS messages are either transferred over GSM signaling channels or on GPRS traffic channels. The signaling between the SMS-C 107 and the BSS 108 and the transfer of SMS messages between the BSS 108 and any specific MSC in the GSM network 100 is all in accordance with the state of the art.

In FIG. 1 a mail server site 150 is arranged to be operatively connected to the GSM network 100 and to provide different e-mail services to users of mobile communication stations 110 via the GSM network. The mail server site is connected to the MSC 105 which manages GSM traffic between the site and the GSM network. The implementation of the mail server site 150 is based on the Internet Cellular Smart Access platform (ICSA, which is a trademark of Microsoft Corporation). The ICSA platform is commercially available from Microsoft Corporation. ICSA is a system platform which enable an operator to provide a number of mobile services to its subscribers. For example, the services of sending and receiving e-mails using a mobile communication station.

One basic functionality of the ICSA platform is the capability of initiating the transmission of SMS (Short Message Service) messages which includes notifications relating to e-mails temporary stored by the ICSA platform. When a mail server included in the ICSA platform receives an e-mail addressed to a specific user, an SMS message with a notification identifying the e-mail is transmitted to a mobile communication station 110 associated with the e-mail address. The SMS message is transmitted via a SMS-C 107 in a GSM network 100. Using the information of the notification the user of the mobile communication station 108 can retrieve the e-mail stored by the ICSA system. The unit responsible in the ICSA platform for transmitting notifications is called the Notification Engine (NE) 160. The NE 160 communicates with the SMS-C 107 over a packet data connection via a Mobile Switching Center, MSC, 105 in accordance with a communication protocol used by the SMS-C 107.

Since the mail server site 150 is based on the above described ICSA platform, it is in FIG. 1 illustrated as including the above-mentioned NE 160, but also a database 175 included in an ICSA platform for storing e-mails, SMS messages, subscriber information etc. The mail server site 150 further includes an SMTP server host 170 and a mail server host 180. The SMTP server host 170 is preferably implemented by an SMTP receiver process running on appropriate hardware connected to or included by the hardware of the ICSA platform. The mail server host 180 is either a POP3 server process or an IMAP4 server process running on hardware connected to, or being identical with, the hardware running the SMTP receiver process.

An exemplifying mode of operation of the overall system in FIG. 1, which operation is in accordance with an embodiment of the present invention, will now be described. For ease of understanding the description includes reference numerals within brackets which refer to FIG. 1 and which indicate the elements involved in a particular information/data flow.

When the SMTP server 170 receives (1) an e-mail message from a sending SMTP server over some kind of transmission network (as indicated with the bi-directional arrow), a job identifier, or agent, is created for the received e-mail. The received e-mail message and its job identifier is stored (2) in the database 175. The job identifier is further transferred (3) from the SMTP server to the NE 160 together with explicit, or implicit, instructions to create an SMS message including the job identifier. This SMS message is to be transmitted to the mobile communication station 110 having the mobile subscription number corresponding to the address to which the e-mail was addressed. The POP3 mail server host 180 is informed that a new e-mail has been received by transferring (4) the job identifier from the SMTP server 170 to the POP3 server 180. The POP3 server relates the received e-mail to a particular mail box by interacting (5) with the database using the received job identifier. The NE requests (6) the mobile subscription number corresponding to the e-mail address from the database 175, using the job identifier to identify the associated e-mail and, thus, the e-mail address. The NE formats the text portion of the created SMS message in accordance with the syntax for the supplementary service. In general, the text portion of an SMS message typically contains 160 7-bit characters. This is the portion of the SMS message which can be modified in dependence of the application providing a supplementary service. Other portions of the SMS message are predefined in accordance with the GSM standardization. An example of a syntax used by the present invention for the user text portion of an SMS message is shown in FIG. 2.

Figure 2:
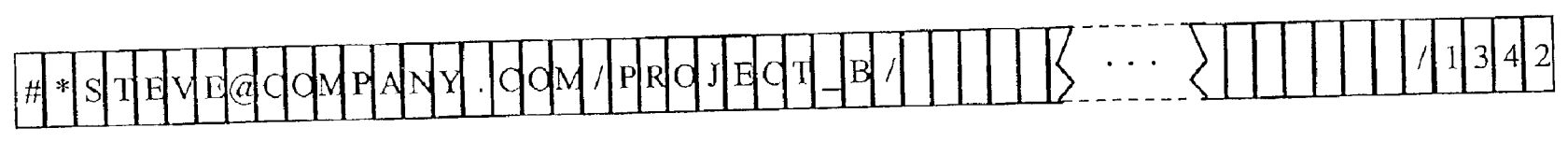

In FIG. 2, the user text portion of the SMS message begins with the characters "#*", which in this case is assumed to be an instruction which indicates to the receiving mobile communication station 110 that the subsequent text field is a notification of a new received e-mail. The notification includes a job identifier, also referred to as "agent" The syntax of the SMS message of FIG. 2 is such that the characters which are located between the initial characters "#*" and a character "/" indicating end of line, relate to a sender, that the subsequent characters up to the next character for end of line "/" relate to the subject of the message, and that the four characters which are placed at the end of the message constitute the identifier or the agent. Thus, provided that the mobile communication station 110 includes the appropriate software for recognizing and decoding SMS text portions with the specific syntax, the mobile communication station 110 can derive the above information from the SMS message and, for instance, present the information as follows:

From: STEVE@COMPANY.COM

Subject: PROJECT B

JobId: 1342

If in this case the receiving mobile communication station is not equipped with appropriate software to recognize a message according to this syntax, the mobile communication station 110 will simply interpret the message as an ordinary text message and thus present the message as follows:

*STEVE@COMPANY.COM

PROJECT B

1342

Turning again to FIG. 1, the mail server site connects to the MSC 105 and initiates the sending (7) of the generated SMS short message which includes the job identifier of the received and stored e-mail message. The transmitted SMS message is addressed to the mobile communication station 110 having the Mobile Station Integrated Services Digital Network, MSISDN number, corresponding to the e-mail address of the received and stored e-mail, and which MSISDN was previously requested by the NE from database 175. The actual transmission of the SMS message is performed via the MSC 105, SMS-C 107, MSC 106 and BSS 108, in accordance with techniques known to a person skilled in the art and provided by the GSM network operator.

Provided that the receiving mobile communication station 110 is equipped with the above-mentioned appropriate software, the reception of the SMS message will be interpreted by the mobile communication station 110 as a notification of that the mobile subscriber, i.e., the user of the mobile communication station 110, has received an e-mail message which now is stored at the mail server site 150.

A client function 112 constitutes the appropriate software that needs to be included by the mobile communication station for using the service of the present invention. The client function 112 implements means for recognizing and decoding the syntax of the text portion of an SMS message as used by the mail server site 150. When a SMS message has been received by the mobile communication station 110, the client function 112 extracts the job identifier and any present e-mail header information from the SMS message. The decoded text portion is displayed to the mobile subscriber on displaying means included by the mobile communication station as a notification of a received e-mail. Using the extracted job identifier, the mobile subscriber can initiate the process of accessing the e-mail stored at the mail server site 150. The job identifier of the notification can be used either directly for accessing the e-mail, or, since the notification automatically will be stored by the mobile communication station 110, at a later stage.

When, and if, the user decides to respond to the received notification, e.g., by simply replaying to the stored SMS message with the notification using a selection from a menu, the client function 112 will forward the job identifier to a mail client host 113 loaded in the mobile communication station and operating in accordance with the POP3 mail delivery protocol. The mail client 113 will in turn interact with means of the kind normally used for accessing traffic channels of the GSM network in accordance with state of the art. The client function 112 will also forward pre-stored addressing information in order for a GSM traffic connection to automatically be established with the mail server site 150 when responding to a notification. The actual connection (8) over the GSM network 100 between the mobile communication station 110 and the mail server site 150 is set up via, among others, the BSS 108 and the MSC switches 105 and 106 in accordance with state of the art.

The reply function of the mobile communication station is, e.g., configured to by default issue a "RETR"-command taking the job identifier as an argument in accordance with the specification of the POP3 mail delivery protocol. In addition, the mobile subscriber may choose to use the job identifier in any other command of the mail delivery protocol which normally takes a Unique Identifier(UID) as an argument. Thus, via the established GSM connection, the POP3 server host 180 will receive a job identifier in a command transmitted over a GSM traffic channel from the POP3 mail client of the mobile communication station.

The client function 112 and the mail client host 113 are software code components executed by a microprocessor arranged within the mobile communication station, which components are supported and/or interact with additional hardware within the mobile communication station in accordance with what is appropriate and obvious to a person skilled in the art. The implementation of the client function component and the configuration/modification of the mail client component 113 will be apparent for a person skilled in the art of programming and being familiar with the GSM system and the POP3 mail delivery protocol.

The POP3 server host 180 is modified to accept UIDs that differ from the length syntax of UIDs as generated by the POP3 server host itself. At reception of the "RETR"-command with the job identifier as an argument, the POP3 server host will interpret the job identifier as a UID, access (9) the database 175, and match the received UID against job identifiers stored in the database 175 at a storage area corresponding to the mail client from which the command was received, i.e., the mail box of the specific mail client. When a match is found the corresponding e-mail message will be retrieved and the established GSM connection will be used for transferring (10) the e-mail message over the GSM traffic channel back to the mobile communication station 110. The modifications of the POP3 server host that are necessary for adapting it to operate with UIDs having the same length and syntax as the above described job identifiers will be apparent for a person skilled in the art of programming.

Although the invention has been described with reference to a specific exemplifying embodiment based on a GSM system providing an SMS service, the described embodiment is not intended to limit the scope of the invention, as defined by the appended claims. Instead, the present invention is well suited for any digital radio communication network that provides a message based service its connected wireless users.

Furthermore, even though the exemplifying embodiment refers to a POP3 mail server host and the POP3 mail delivery protocol, it is to be understood by a person skilled in the art, that the present invention is applicable in connection with any mail server host and corresponding mail delivery protocol which handles unique identifiers in a similar way as a POP3 mail server host when identifying e-mail messages stored by the mail server host and when providing a corresponding mail client host with access to stored e-mails.

Thus, many different alterations, modifications and the like, within the scope of the appended claims, will become apparent for those skilled in the art.

What is claimed is:

1. A method at a mail server site, the mail server site being operatively connected to a digital radio communication network and arranged to provide mobile e-mail services to mobile communication stations by means of a server host operating in accordance with POP3 or IMAP4 protocols, wherein the method comprises:
   allocating, in an SMTP server, a job identifier to a received e-mail;
   storing said job identifier and said received e-mail in a database at a position associated with a client host to which said received e-mail was addressed;
   treating, in said server host, said job identifier as a unique identifier for said received e-mail when communicating with said client host in accordance with the POP3 or IMAP4 protocol; and
   transmitting a notification to a mobile communication station defined by a mobile subscription number which is associated with said client host in said database, the notification indicating that said e-mail has been received and including at least said job identifier.

2. The method as claimed in claim 1, wherein said notification includes header information of an e-mail.

3. The method as claimed in claim 1, wherein said server host, when operating in accordance with said POP3 or IMAP4 protocol, is responsive to a received client host command in which a present unique identifier has the same format and syntax as that of said job identifier.

4. The method as claimed in claim 3, wherein said server host, when responding to a client host command which includes a unique identifier, matches the unique identifier against job identifiers that are stored in said database and that are associated with the client host from which the client host command was received.

5. The method as claimed in claim 1, wherein said server host, when responding to a client host command which includes a unique identifier, matches the unique identifier against job identifiers that are stored in said database and that are associated with the client host from which the client host command was received.

6. The method as claimed in claim 1, wherein said act of transmitting a notification includes transmitting a message using a message service provided by said digital radio communication network, said job identifier being included in the payload of said message.

7. A computer-readable medium comprising computer-executable components for causing a mail server site, which is operatively connected to a digital radio communication network, to provide mobile e-mail services to mobile communication stations by means of a server host operating in accordance with POP3 or IMAP4 protocols, the computer-executable components including:
   a component for allocating a job identifier to a received e-mail;
      a component for storing said job identifier and said received e-mail in a database at a position associated with a client host to which said received e-mail was addressed;
      a component implementing a POP3 or IMAP4 server host, which server host uses said job identifier as the unique identifier for said received e-mail when communicating with said client host in accordance with the POP3 or the IMAP4 protocol; and
      a component for initiating transmission of a notification including at least said job identifier to a mobile communication station, which mobile communication station is defined by a mobile subscription number being associated with said client host in said database, in order to indicate to said mobile communication station the said e-mail has been received by the mail server site.

8. The computer-readable medium as claimed in claim 7, wherein said notification includes header information of an e-mail.

9. The computer-readable medium as claimed in claim 7, wherein the component implementing a POP3 or IMAP4 server host is responsive to a received client host command in which a present unique identifier has the same format and syntax as that of said job identifier.

10. The computer-readable medium as claimed in claim 9, wherein the component implementing a POP3 or IMAP4 server host, when responding to a client host command which includes a unique identifier, matches the unique identifier against job identifiers that are stored in said database and that are associated with the client host from which the client host command was received.

11. The computer-readable medium as claimed in claim 7, wherein the component implementing a POP3 or IMAP4 server host, when responding to a client host command which includes a unique identifier, matches the unique identifier against job identifiers that are stored in said database and that are associated with the client host from which the client host command was received.

12. The computer-readable medium as claimed in claim 7, wherein the component for initiating transmission of at least said job identifier initiates the transmission of a message of the kind provided by a message service of said digital radio communication network, said job identifier being included in the payload of said message.

13. A mail server site operatively connected to a digital radio communication network and arranged to provide mobile e-mail services to mobile communication stations, the mail server site comprising:

an SMTP server arranged to allocate a job identifier to a received e-mail and to store the job identifier and the received e-mail in a database at a position associated with a client host to which the received e-mail was addressed;

a server host arranged to operate in accordance with a POP3 or IMAP4 protocol, which server host is configured to use said job identifier as the unique identifier for said received e-mail when communicating with said client host; and means for indicating to a mobile communication station that said e-mail has been received by the SMTP server by transmitting a notification including at least said job identifier to the mobile communication station, which mobile communication station is defined by a mobile subscription number being associated with said client host in said database.

14. The mail server site as claimed in claim 13, wherein said notification includes header information of an e-mail.

15. The mail server site as claimed in claim 13, wherein said server host is configured to be responsive to a received client host command in which a present unique identifier has the same format and syntax as that of said job identifier.

16. The mail server site as claimed in claim 15, wherein said server host is arranged to, when responding to a client host command which includes a unique identifier, match the unique identifier against job identifiers that are stored in said database and that are associated with the client host from which the client host command was received.

17. The mail server site as claimed in claim 13, wherein said server host is arranged to, when responding to a client host command which includes a unique identifier, match the unique identifier against job identifiers that are stored in said database and that are associated with the client host from which the client host command was received.

18. The mail server site as claimed in claim 13, wherein said means for indicating to a mobile communication station that said e-mail has been received is arranged to transmit a message using a message service provided by said digital radio communication network, wherein said job identifier is included in the payload of said message.

19. A method in a mobile communication station for utilizing mobile e-mail services provided by a mail server site, the services being provided via a digital radio communication network and by means of a server host operating in accordance with a POP3 or IMAP4 protocol, wherein the method comprises:

receiving a message at the mobile communication station via a message service provided by the digital radio communication network, the message being transmitted from the mail server site and comprising a unique job identifier corresponding to an e-mail stored at the mail server site;

extracting at the mobile communication station the job identifier from the received message;

conveying at the mobile communication station the extracted job identifier to a user of the mobile communication station; and accessing at least part of the e-mail stored at the e-mail server site using a POP3 or a IMAP4 protocol by transmitting a client host command from the mobile communication station to the mail server site, in which command the job identifier is used as a unique identifier for the e-mail which is to be accessed.

20. The method as claimed in claim 19, including the act of extracting e-mail header information from said received message.

21. The method as claimed in claim 19, wherein the mobile communication station has a mobile subscription number corresponding to an address to which the e-mail was addressed.

22. A mobile communication station comprising a program storage device storing computer-executable components which when executed causes the mobile communication station to make use of mobile e-mail services provided by a mail server site, the services being provided via a digital radio communication network and by means of a server host operating in accordance with a POP3 or IMAP4 protocol, the computer-executable components comprising:

a first component for receiving a message at the mobile communication station via a message service provided by the digital radio communication network, the message being transmitted from the mail server site and comprising a unique job identifier corresponding to an e-mail stored at the mail server site and for extracting at the mobile communication station the job identifier from the received message; and a second component implementing a POP3- or IMAP4-like client host at the mobile communication station, which component is arranged to access at least part of the e-mail stored at the mail server site by transmitting a client host command from the mobile communication station to the server host, in which command the job identifier is used as the a unique identifier for the e-mail which is to be accessed.

23. The mobile communication station as claimed in claim 22, wherein said first component further is arranged for extracting e-mail header information from said received message.

* * * * *